United States Patent Office.

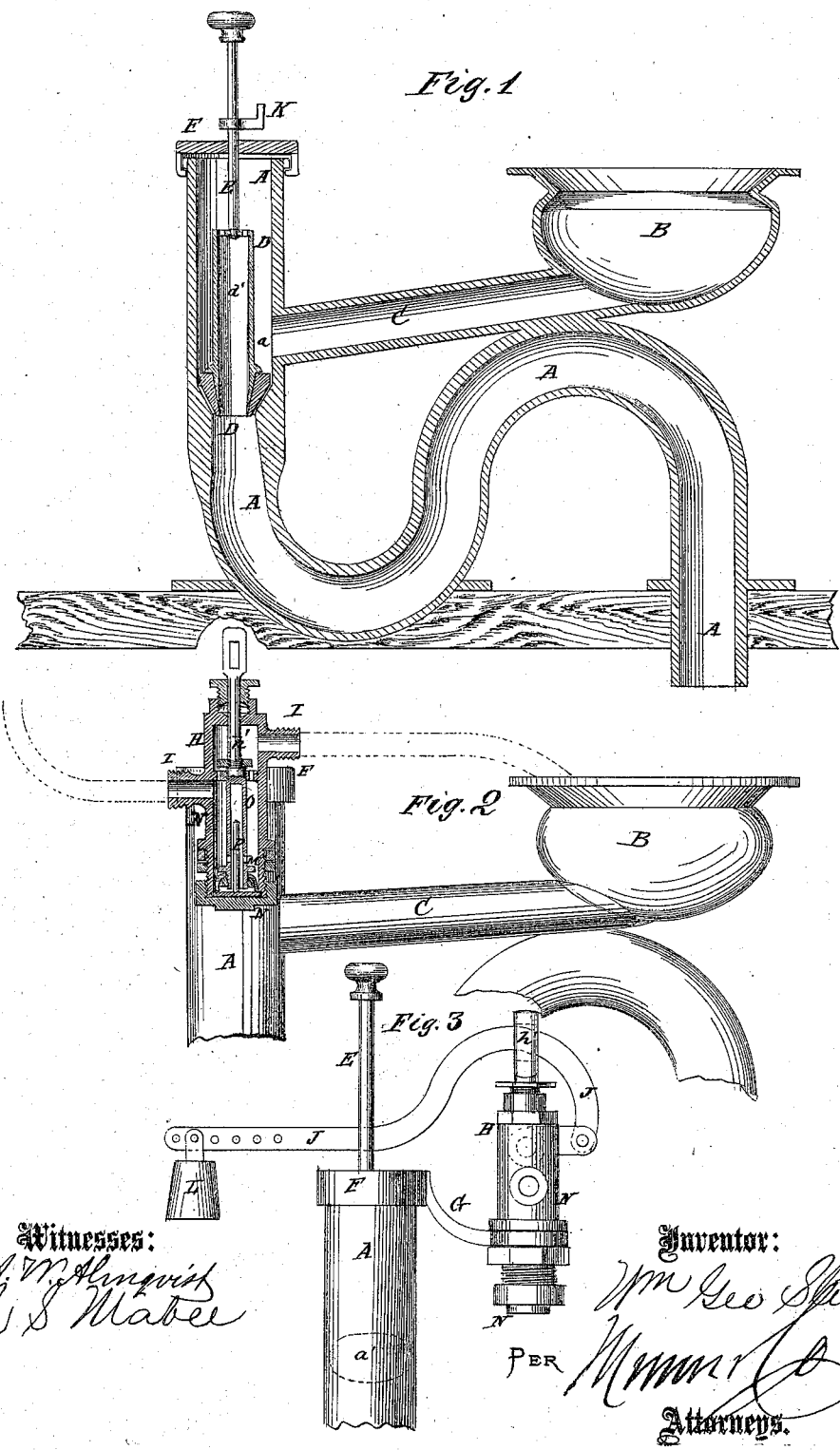

WILLIAM GEORGE STUART, OF SPRINGFIELD, MASSACHUSETTS, ASSIGNOR TO JOHN W. TRAFTON, OF SAME PLACE.

Letters Patent No. 106,231, dated August 9, 1870.

IMPROVEMENT IN WATER-CLOSETS.

The Schedule referred to in these Letters Patent and making part of the same.

*To all whom it may concern:*

Be it known that I, WILLIAM GEORGE STUART, of Springfield, in the county of Hampden and State of Massachusetts, have invented a new and useful Improvement in Water-closet Apparatus; and I do hereby declare that the following is a full, clear, and exact description thereof, which will enable others skilled in the art to make and use the same, reference being had to the accompanying drawing forming part of this specification.

Figure 1 is a detail vertical section of a water-closet apparatus.

Figure 2 is a front view of the same, with a detail sectional view of the supply-valve and regulator.

Figure 3 is a side view of the same.

Similar letters of reference indicate corresponding parts.

This invention has for its object to improve the construction of valves and other regulating apparatus for water-closets, and other uses, where an intermittent flow of water or other liquid is required, and which shall be simple in construction, reliable in operation, and not liable to get out of order; and It consists in the construction and combination of the various parts of the apparatus, as hereinafter more fully described.

A is the discharge-pipe, which is bent to form a trap in the ordinary manner.

B is the pan, which is connected with the ascending leg of the trap A, by a pipe, C, through an opening, $a'$, just above the seat of the valve, D.

The valve D is attached to the lower end of the rod or stem E, which passes up through the cap, F, of the pipe A, and has a knob attached to its upper end, for convenience in operating it, and which projects above the water-closet seat in the ordinary manner.

The valve D may be made hollow, and of such a length that its upper end may be at the height at which it is desired to have the water stand in the pan B, so that the surplus water may flow off through the hollow, $d'$, of the valve, which hollow thus forms an overflow-passage.

If desired, the valve D may be made solid, and the overflow-passage may be in the pipe A, or may be a branch-pipe, connected with the said pipe at the water-line, and below the valve D.

The trap A, pipe C, and pan B, may be made in one piece of earthenware, cast-iron, or other suitable material, or they may be made in two or more pieces and cemented together.

The cap F of the trap A has an arm, G, formed upon it, which carries the supply-valve H, which is connected with the supply-pipe I. The valve-stem $h$ passes out through the top of the valve H, and its upper end is connected with the lever J, which is curved, so that its end may be pivoted to the upper part of the valve H, and its other end may rest upon a stop, K, attached to the valve-stem E.

From the end of the lever J, projecting beyond the stem E, is adjustably suspended a weight, L, as shown in fig. 3. By this construction, when the discharge-valve is opened by means of the valve-stem E, the same operation opens the supply-valve, and allows the water to flow into the pan.

The quantity of water supplied to a water-closet at each opening of the valves is regulated by a self-acting apparatus, as follows:

At the same time that the supply-valve is opened, a piston, M, is raised in a cylinder, N, in which it works, and which may be connected with the valve H, as shown in fig. 2, or may be placed in any other convenient position. The piston M, after being raised and released, is caused to descend by a weight or spring. When a weight is used, it may be the weight L, or an independent weight, as may be desired or convenient.

The descent of the piston M is retarded by water, oil, or other liquid, which the cylinder N contains, the cup-leathers of said piston M being so formed as to allow the piston to rise freely through the liquid, but prevent its descent. A passage, by which the oil or other liquid can return slowly to the upper side of the valve or piston M, is provided, by making the piston-rod O hollow or tubular, and forming one or more openings through its side above the valve or piston M, as shown in fig. 2.

A regulating-rod or wire, P, is secured in the bottom of the cylinder N, which passes up into the tubular piston-rod O, so that the oil or other liquid, in passing from the lower to the upper side of the piston M, has to pass through the narrow space between the wire or rod P, and the interior surface of the hollow piston-rod O, its passage being more or less slow, according as the said wire or rod more or less nearly fills the interior of the said hollow piston-rod O.

This construction enables the supply-valve to be set to close automatically after any desired interval.

In case it is desired to afford an opportunity for readily altering the adjustment of the apparatus from time to time, the wire or rod P may be made in the form of a tube, and placed upon the outside of the piston-rod O. The oil or other liquid, in this case, passes from beneath the piston M, up through the interior of the piston-rod O, and through a passage at its top, which passage is regulated at will by a set-screw or plug.

The oil or other liquid, escaping through this passage, returns through the space between the two tubes into the cylinder N, above the piston M.

This regulating apparatus may be used wherever regulated quantities of liquid are required to be supplied at intervals.

Having thus described my invention,

I claim as new and desire to secure by Letters Patent—

1. The combination of the discharge-valve D, and supply-valve H, with rod E and weighted lever J, to enable the two valves to be opened and closed simultaneously by a person sitting upon the pan B.

2. The tubular piston-rod O, and wire P, constructed and arranged in the tube N, as and for the purpose specified.

Witnesses: WILLIAM GEORGE STUART.
GEO. B. MORRIS,
JNO. O. WILLIAMS.